United States Patent
Bouzianas et al.

(10) Patent No.: US 10,481,744 B2
(45) Date of Patent: Nov. 19, 2019

(54) COMPUTERIZED METHODS AND COMPUTER APPARATUS FOR DETERMINING THE VALUES OF PHYSICAL QUANTITIES IN PROBLEMS GOVERNED BY POISSON OR HELMHOLTZ EQUATIONS, AND METHOD FOR FABRICATING AN ELECTRONIC COMPONENT

(71) Applicant: Fieldscale, Salonika (GR)

(72) Inventors: Georgios Bouzianas, Salonika (GR); Nikolaos Zikos, Salonika (GR); Nikolaos Sismanis, Salonika (GR)

(73) Assignee: FIELDSCALE, Salonika (GR)

( * ) Notice: Subject to any disclaimer, the term of this patent is extended or adjusted under 35 U.S.C. 154(b) by 0 days.

(21) Appl. No.: 15/927,452

(22) Filed: Mar. 21, 2018

(65) Prior Publication Data
US 2018/0275798 A1 Sep. 27, 2018

(30) Foreign Application Priority Data
Mar. 21, 2017 (EP) .................... 17386012

(51) Int. Cl.
G06F 3/044 (2006.01)
G03G 15/00 (2006.01)
G06F 17/12 (2006.01)
G06F 17/16 (2006.01)

(52) U.S. Cl.
CPC ............. *G06F 3/044* (2013.01); *G03G 15/00* (2013.01); *G06F 17/12* (2013.01); *G06F 17/16* (2013.01); *G06F 2203/04103* (2013.01)

(58) Field of Classification Search
CPC combination set(s) only.
See application file for complete search history.

(56) References Cited

PUBLICATIONS

European Search Report and Written Opinion from European Application No. 17386012.3 (dated Sep. 27, 2017).
Sivaram Ambikasaran et al: "The Inverse Fast Multi Pole Method", Jul. 7, 2014 (Jul. 7, 2014), pp. 1-25, XP055408216. Retrieved from the Internet: URL: https://www.researchgate.net/profile/Eric_Darve/publication/263736197_The_Inverse_Fast_Multipole_Method/links/54ecacda0cf28f3e65347d7d/The-Inverse-Fast-Multipole-Method.pdf [retrieved on Sep. 20, 2017].
Han Guo et al: "Hierarchical Matrices Method and Its Application in Electromagnetic Integral Equations", International Journal of Antennas and Propagation, vol. 2012, Feb. 1, 2012 (Feb. 1, 2012), pp. 1-9, XP055408225.

*Primary Examiner* — Robin J Mishler
(74) *Attorney, Agent, or Firm* — Merchant & Gould P.C.

(57) ABSTRACT

A computer system and method are proposed for solving physical problems governed by Poisson or Helmholtz equations. Values of at least one unknown physical quantity at points are determined using known values of at least one second physical quantity. The points are clustered into a hierarchical skeleton structure using a clustering algorithm based on distances between the points. Interactions between distant clusters are approximated, to give a system of equations which can be solved more efficiently.

9 Claims, 7 Drawing Sheets

(a)

(b)

(c)

COMPUTERIZED METHODS AND COMPUTER APPARATUS FOR DETERMINING THE VALUES OF PHYSICAL QUANTITIES IN PROBLEMS GOVERNED BY POISSON OR HELMHOLTZ EQUATIONS, AND METHOD FOR FABRICATING AN ELECTRONIC COMPONENT

This application claims benefit of Ser. No. 17/386,012.3, filed 21 Mar. 2017 in Europe and is incorporated herein by its reference. To the extent appropriate, a claim of priority is made to each of the above-disclosed applications.

FIELD OF THE INVENTION

The present invention relates to computer-implemented methods and computer systems for determining the values of first physical quantities due to second physical quantities, the first and second physical quantities being related according to a Poisson or Helmholtz equation. The present invention further relates to a method for fabricating electronic components.

BACKGROUND OF THE INVENTION

Fast algorithms are essential for the solution of large systems of linear and non-linear equations that may contain millions of unknowns. Large systems may arise from the discretization of boundary integrals using the boundary element method (BEM) in physical problems governed by a Poisson or Helmholtz equation. This large category of problems includes fluid mechanics, electrostatic, and electrodynamic applications, such as problems of estimating capacitative and scattering effects.

Writing the problem in a BEM discretized manner in terms of a number N of boundary element degrees of freedom associated with the boundary elements that discretize the integral space gives a system of equations of the form $$Ax=b, \quad (1)$$

where $x \in \mathbb{C}^N$ is the vector indicating the N degrees of freedom. The N degrees of freedom are the unknown values of a first physical quantity (such as an electric or magnetic field, or a charge or current density). Every boundary element has one or more degrees of freedom assigned to it. Also, every boundary element is represented in space by one or more point locations. We refer to these point locations as discretization points or simply as points. For the rest of the text, we assume for simplicity that each boundary element has one degree of freedom and is represented in space by one discretization point, but this should not be considered limiting or restraining. The matrix $A \in \mathbb{C}^{N \times N}$ is the BEM matrix (also called here "interaction matrix"; in other literature it is called the "kernel matrix"), and $b \in \mathbb{C}^N$ is vector of the known values of a second physical quantity (e.g. capacitance) at each of the N discretization points. The i-th and j-th entry of A define the interaction between the i-th and j-th discretization points.

The categories of solvers used for the solution of Eqn. (1) for large systems are iterative solvers and direct solvers. Iterative solvers are conjugate gradient based methods such as GMRES (the generalized minimal residual method) and Bi-CGSTAB (the biconjugate gradient stabilized method). The efficiency of iterative solvers depends on the speed of matrix-vector multiplication. The most commonly used fast matrix-vector methods include the fast multipole methods (FMM) and recursive skeletonization (RS). These methods reduce the time requirement for the matrix-vector multiplication from $O(N^2)$ to $O(N)$. Iterative solvers have been successful and widely adopted but they have certain disadvantages: (i) The number of iterations needed to reach the solution depends on the condition number of the BEM matrix A. As a result, the solution time degrades with the condition number of A. Ill-conditioned systems are common in geometries with very close point interactions. (ii) Iterative solvers do not exploit low-rank modifications of the matrix A. Low-rank modifications may be factored using Sherman-Morison-Woodbury formula, simplifying the solution.

Direct solvers are based on BEM matrix inversion (i.e. finding $A^{-1}$), instead of matrix-vector multiplication. The matrix inversion is time-wise more expensive compared to the matrix-vector multiplication, but the solution time of the linear system does not depend on the condition number of the BEM matrix. The fast matrix inversion is based on matrix compression techniques, such as recursive skeletonization. Direct solvers are advantageous compared to iterative solvers for solving systems of equations with "multiple right-hand sides", i.e. systems of equations which, for m an integer greater than one, have the form:

$$AX=B, \quad (2)$$

where $B \in \mathbb{C}^{N \times m}$ is a matrix of m column vectors of known second physical quantities and $X \in \mathbb{C}^{N \times m}$ is a matrix of unknown first physical quantities. Eqn. (1) is the special case of Eqn. (2) for m=1. Each column of X is referred to as a "right hand side". In systems with multiple right hand sides the matrix inversion $A^{-1}$ only has to be computed once. The inverted matrix is reapplied to every right hand side of X. Thus, the direct solver reuses more pre-computed information compared to an iterative solver that solves the m systems independently without information reuse.

The recursive skeletonization computes a compressed representation of A or $A^{-1}$ by utilizing the block low-rank structure of the matrix [1]. The same block low-rank structure of the BEM matrix is utilized in the Fast Multipole Method (FMM). For a matrix to be compressible, it has to be block-separable. All off-diagonal blocks are low rank and admit to the low-rank factorization $A_{i,j}=L_i M_{i,j} R_{i,j}$, where $A_{i,j} \in \mathbb{C}^{n_i \times n_j}$ denotes the i-th and j-th off-diagonal block of the matrix, $L_i \in \mathbb{C}^{n_i \times r_i}$, $M_{i,j} \in \mathbb{C}^{r_i \times r_j}$ and $R_j \in \mathbb{C}^{r_j \times n_j}$ for some integers $r_i$ and $r_j$, for $r_i$, $r_j \ll n_i$. If a hierarchy is imposed on the rows and columns of A and all levels of that hierarchy are block separable, then the matrix is compressible by recursive skeletonization. The hierarchy, also known as the skeleton structure, is imposed by a spatial decomposition of the domain of the points. In recursive skeletonization, the skeleton structure is realized by an octree. The block-separability of A depends on the adaptivity of the octree to the geometry of the points. For highly irregular geometries with close point interactions the adaptivity of the octree has been proved to be inefficient, as the off-diagonal blocks of the matrix A may be almost full rank.

SUMMARY OF THE INVENTION

The present invention aims to provide new and useful methods for solving systems of equations, particularly ones which arise from the discretization of boundary integrals in irregular geometries.

In general terms, the invention proposes adopting a skeleton structure based on clustering. This makes it possible to overcome the issue of adaptivity of the skeleton to irregular geometries.

The novelty of the present approach resides in the adaptivity of the hierarchical clustering skeleton structure to the discretization point distribution, geometry, and density.

In an embodiment of the invention, the criterion of clustering is the proximity of the point. Points that are spatially close are assigned to the same cluster. The hierarchical clustering skeleton provides a compressible matrix decomposition because the kernel interactions between clusters of points degrade with the distance. In an exemplary embodiment, we use k-means clustering which maximizes the distance of inter-cluster points and as a result minimizes the interactions between inter-cluster points.

The proposed approach may be implemented in either a direct solver or an iterative solver. In either case, recursive skeletonization with a hierarchical clustering skeleton can be used for fast matrix-vector multiplication and/or matrix inversion. The clustering makes possible compressible matrix decomposition in an irregular system geometry.

The presented approach makes possible a computer-implemented method for efficiently solving a system of equations to obtain a desired parameter of the system, for the solution of physical problems governed by the Poisson of Helmholtz equations. Interactions between pairs of distant clusters (that is, pairs of clusters which obey a distance criterion) are approximated, to efficiently solve the objective system of equations. The values of one unknown first physical quantity x may be estimated based on the values of one known second physical quantity b, where the two are related by an expression according to Eqn. (1). Alternatively, the values of a plurality of unknown first physical quantities X may be estimated based on the values of the same number of known second physical quantities B, where the two are related by an expression according to Eqn. (2).

In an embodiment, the method includes a step of setting up the system as a predefined structure that enables the solution, for the desired set of parameters, to be determined. The system uses an interaction matrix. A solver (iterative or direct) is then executed to invert the interaction matrix and determine the matrix-vector product between the inverted interaction matrix and the vector of known quantities (the right-hand side of the system). Finally, the system solution is displayed to the user in a tangible form, for example on a display.

The step of setting up the system or device as a predefined structure may include a step of decomposing the system using a hierarchical clustering skeleton. Further, the step of decomposing the system using a hierarchical clustering skeleton comprises the step of clustering the system into an arbitrary, predefined number of clusters forming the 1-st level of the tree; and recursively repeating the clustering process for the resulting clusters until the desired number of levels is created. The levels may be denoted by an integer $l=0, \ldots, L$. Thus the hierarchical skeleton may be considered as having $L+1$ levels. The numbering of the tree levels starts from 0, but the level $l=0$ is the root of the tree. It is not formed by clustering the points; rather it is a set that contains all points.

The hierarchical tree is used to form a compressed interaction matrix. At each level, the compressed interaction matrix approximates the physical interaction between pairs of discretization points which do not meet a first proximity criterion which based on the cluster in which a first of the points lies. The first proximity criterion may be that the second point is within a proxy surface of the cluster in which the first of the points lies For each cluster of the tree, the method may create and maintain a list of the near neighbor clusters, meeting a second proximity criterion. Note that in the prior art method using an octree, there is no need for a second proximity criterion: The clusters have the shape of boxes with fixed boundaries. The neighborhood of every cluster is clearly defined prior to the tree formation, and there is no need for extra search to find the points that lie within a proxy surface. The second proximity criterion, however, is valuable for embodiments of the present invention, because a clustering algorithm is used to divide the points into clusters. The resulting clusters may be irregularly shaped, and the neighborhood of every cluster is not defined prior to the tree formation. To avoid searching the entire domain of clusters for points that lie within a proxy surface, the neighbors must be chosen according to a criterion. The second proximity criterion is one of the elements that make the embodiment computationally affordable and competitive compared to the octree algorithm used in the prior art.

The step of setting up may further include a step of setting up recursive skeletonization operators that allow the matrix inversion. The step of setting up the recursive skeletonization operators further comprises the step of setting up operators that allow the matrix compression.

Another aspect of the present approach is directed to a computer program product comprising program instructions, such as tangible memory medium on which executable machine instructions are stored in non-transitory form. When executed by a processor, these program instructions cause the processor to carry out the steps of the method discussed above.

Yet another aspect of the presented invention is directed to a computer system for efficiently solving a system of equations for a desired parameter of a physical system governed by the Poisson of Helmholtz equations. The apparatus includes a memory (data storage device) for storing machine instructions to carry out the steps of the method discussed above.

The computer system typically further includes: a user interface to enable (i) a user to input data defining the problem input, and/or (ii) the computer system to output data representative of the solution, such as in graphical form.

One specific expression of the invention is a computer-implemented method of determining, for each of a plurality of discretization points in a space, at least one corresponding boundary element degree of freedom which is the unknown value of at least one respective first physical quantity at the discretization point, using the known values of at least one respective second physical quantity at the discretization point, the number of first physical quantities being no higher than the number of second physical quantities, the at least one second physical quantity at each discretization point being a linear function of the values of the at least one first physical quantity at the discretization points, the linear function being expressed via an interaction matrix A having elements which correspond to respective pairs of the discretization points, each element of the interaction matrix A encoding, for each pair of the boundary elements, physical relations between the first and respective second physical quantities at the corresponding pair of boundary elements, the physical relations being according to a Poisson or Helmholtz equation, the method comprising the steps of:
(a) repeatedly applying a clustering algorithm, to classify the discretization points into a hierarchical tree structure having a plurality $L+1$ of levels, labeled by an integer index $l=0, \ldots, L$, where level l=0 of the tree structure is all the discretization points, level l=1 of the tree structure is composed of non-overlapping clusters of the discretization points, and for I=2, . . . , L, level l of the tree structure is composed of, for each cluster of the (I−1)-th level, a respective plurality of non-overlapping clusters of the discretization points of that cluster of the (I−1)-th level;

(b) using the hierarchical tree structure to form a compressed interaction matrix which is expressed recursively according to the levels; and (c) determining the at least one first physical quantity from the known values of the respective at least one second physical quantity and the compressed interaction matrix.

The formation of the hierarchical tree may be performed in a bottom-up manner. In this case, the formation of the tree structure may comprise:

(i) clustering the discretization points into a plurality of non-overlapping clusters based on the discretization point positions using the clustering algorithm, the clusters constituting the respective discretization points of the L-th level of the tree structure and being associated with respective cluster positions; and (ii) successively, for I=L−1, . . . 1, clustering the discretization points of the (I+1)-th layer of the tree together based on the cluster positions of the elements at the I+1-th layer of the tree by the clustering algorithm, thereby forming a plurality of non-overlapping clusters of elements at the I-th layer of the tree, whereby each cluster at the I-th level is associated with a corresponding plurality of clusters at the I+1-th level.

The clustering may alternatively be performed in a top-down manner. In this case, the formation of the hierarchical tree structure may comprise:

(i) clustering the discretization points into a plurality of non-overlapping clusters by the clustering algorithm based on the discretization point positions, the clusters constituting the respective elements of the 1-st level of the tree structure and being associated with respective cluster positions; and (ii) successively, for I=2, . . . L, for each cluster of the (I−1)-th layer of the tree, clustering the discretization elements of that cluster of the (I−1)-th layer into a plurality of non-overlapping clusters of discretization elements by the clustering algorithm based on the positions of those discretization elements, whereby each cluster at the (I−1)-th level is associated with a corresponding plurality of clusters at the I-th level.

Note that in either case, optionally, the clustering algorithm may optionally be varied a certain times during the process.

The present method may include a preliminary step of measuring the second physical quantity in a physical system which exhibits the first and second physical quantity. The measurement may be carried out using sensors which are sensitive to the second physical quantity. Thus, using the method, the values of the first physical quantity (which may be harder to measure than the second physical quantity) are obtained.

Alternatively, the present method may include generating (e.g. using a computerized design system) a three-dimensional numerical model of an electronic component which exhibits the first physical quantity (e.g. electrical charges). The numerical model may include the values of the second physical quantity (e.g. electrical potential) at locations in the model. Using the method, corresponding values of the first physical quantity are determined. The method compares the derived values of the first physical quantity to a criterion, and dependent upon the result of the comparison, the electronic component is fabricated according to the numerical model.

BRIEF DESCRIPTION OF THE DRAWINGS

Non-limited embodiments of the invention will now be explained with reference to.

DETAILED DESCRIPTION OF THE INVENTION

Figure 1:
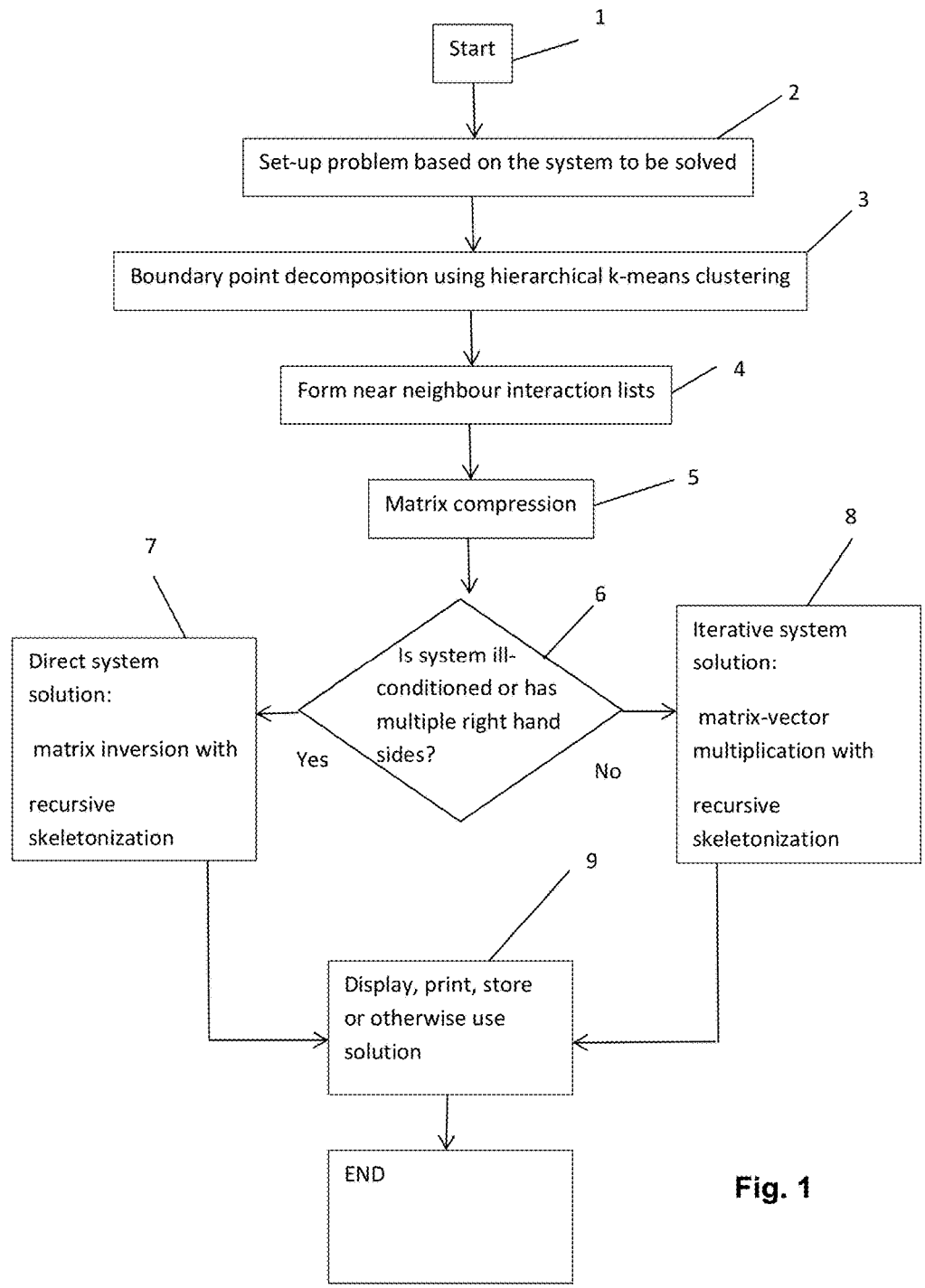
FIG. 1, which shows a flow-chart of a method which is a first embodiment of the invention.

Referring to FIG. 1, a flow chart is shown of a method which is an embodiment of the invention. The method is performed by a computer apparatus as explained below with reference to FIG. 7.

1. Initiation

In a first step 1, the method starts.

In step 2, the problem to be solved is set up based on the problem to be solved. The problem is one of the form of Equation (1), which relates at least one first physical quantity to at least one second physical quantity. Step 2 includes inputting the set of N discretization points, and for each discretization point the respective value of each second physical quantity. It further includes defining the matrix A based on a Poisson or Helmholtz equation. Note that at this point the matrix A is defined analytically, not numerically. As discussed below, a compressed form of matrix A is used, and this compressed form is numerically computed by the embodiment, but the matrix A itself does not have to be numerically computed.

2. Hierarchical Clustering Skeleton

In step 3, the apparatus decomposes the discretization points hierarchically into a set of clusters, thereby forming a "skeleton". The clusters are groups of points that share the same bounding box. Each cluster is represented by the cluster center and the cluster range. The center is the mean of all points that belong to the cluster. The range is the distance of the farthest point from the center of the cluster.

The skeleton is adaptive to the distribution and geometry because points are grouped into clusters based on their proximity to their cluster center, and it is adaptive to the density because the formation of new clusters is controlled by the number of points that are assigned to a cluster, i.e. the cluster population. The center of a cluster is the mean of the coordinates of all the points that belong to a cluster. The clusters that form the skeleton have a hierarchical parent-child relationship. The skeleton formation process is recursive, and every given cluster is subdivided into k clusters which are the children of the given cluster.

Specifically, the skeleton comprises a plurality of levels. Considering a certain cluster at the level l, this cluster is the parent cluster of children at level l+1. The parent is denoted by P, and the set of children of P is denoted by C(P). The root of the skeleton is one cluster, at level 0, which includes all discretization points. The clusters of level 1 are formed by clustering the discretization points of the root. The children of any given cluster at level l are formed by clustering the discretization points that belong to the given cluster.

The recursion stops when the number of points which belong to a child cluster is lower than a prescribed population threshold $\Theta$. A cluster with such a number of points is not further divided. The level of the skeleton where the clusters do not form any children is the "height" L of the skeleton. The clusters that are not subdivided and have no children are the terminal clusters in the hierarchy and are called the "leaves".

The formation of the clusters may be performed recursively or iteratively. In a recursive formulation, as shown by the Algorithm 1 which is provided here in pseudo-code, a function subdivideCluster(P) is defined which given an input cluster P forms the children clusters. The first step of subdivideCluster (P) is to call the function clusterSize(P) which returns the number of points assigned to the input cluster. If the number of points is greater than $\Theta$, the function cluster(P) is called to cluster the points of P to produce a plurality of children C. The function subdivideCluster( ) is recursively called for each child cluster formed.

---
Algorithm 1: Hierarchical clustering
---

$\Theta$: Population threshold
C: Set of Children clusters
P: Parent cluster
    Function P = subdivideCluster(P)
        If clusterSize(P) ≥ $\Theta$ then
            C(P) ← cluster(P)
            for all $c_i \in$ C(P) do
                $c_i$ ← subdivideCluster($c_i$)

---

The function subdivideCluster (P) uses the k-means clustering algorithm, which minimizes the intra-cluster distances of points to their cluster center and maximizes the inter-cluster distance of points to other cluster centers. In other embodiments, however, other clustering algorithms may be used, and in particular, any other algorithm that optimizes the above objectives.

The algorithm subdivideCluster (P) may be iterative. In the first iteration, the cluster centers are initialized. The distance of every point from the cluster centers is computed, and the center that is closer to every point is found. Every point is assigned to the cluster whose center is closest. When all points are assigned to clusters, the cluster centers are updated. A new cluster center is computed by taking the mean of the coordinates of all the points that belong to that cluster. The algorithm iterates until the sum of distances between the cluster points and the cluster center in all clusters becomes smaller than a pre-set value or until a pre-set number of interactions is reached.

Figure 2:
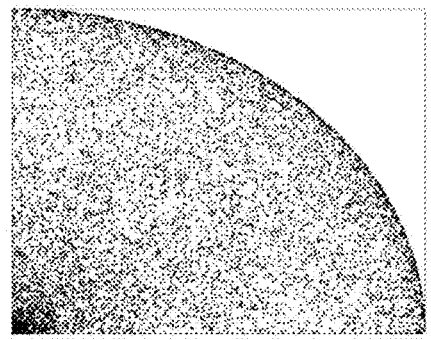
FIG. 2, which is composed of FIGS. 2(a)-(c), illustrates sample discretization point distribution and spatial decomposition up to three levels of a hierarchical clustering skeleton.
Figure 2:
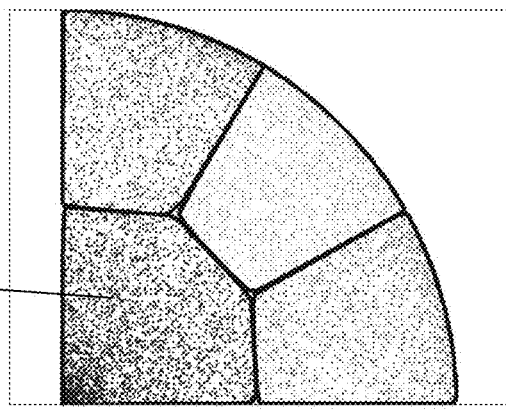
Figure 2:
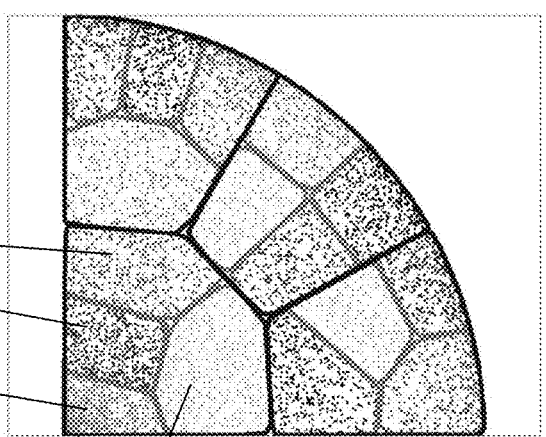

An example of the hierarchical clustering decomposition is shown in FIGS. 2(a), 2(b), 2(c), depending on the point distribution. FIG. 2(a) shows level 0 of the hierarchical clustering skeleton, consisting of a single cluster, the root. In this example, all the points lie on a surface which is one quadrant of a sphere. FIG. 2(b) shows level 1 of the hierarchical clustering skeleton consisting of 4 clusters, one of which is labelled 11. FIG. 2(c) shows the level 2 of the hierarchical clustering skeleton consisting of 16 clusters. The four level 2 clusters which are children of the level 1 cluster 11 are labelled 12, 13, 14 and 15.

Thus, the skeleton is a tree structure which is formed in a top-down manner (i.e. starting from level 1 and successively increasing l to reach l=L).

Note that in a variation of the step 2, the formation of the skeleton can be performed in a bottom-up up manner. In this case, the clusters of level l=L are formed first as non-overlapping subsets of the discretization points. For l= 2, . . . L the clusters of the (l−1)-th layer are formed as respective non-overlapping subsets of the clusters of the l-th layer, grouped into the sub-sets based on respective cluster positions. The l=0 level of the tree structure is all the discretization points, i.e. the sum of the clusters of the 1-st layer.

3. Near and Far-Field Interactions

The decomposition of the discretization points from the skeleton structure allows a distinction between the far-field and near-field interactions. Far-field interactions occur between discretization points that are sufficiently far for their interactions to be approximated. The near-field interactions occur between discretization points that are close, and their interactions are computed explicitly.

In matrix compression, the boundary between the near and far-field interaction is the proxy surface, which is a bounding surface that encloses all near-field interactions and excludes all far-field interactions. Far-field interactions are approximated by an artificial set of points of the first physical quantity (e.g. charges) that are placed on the proxy surface. In our exemplary embodiment, the proxy surface of every cluster is a sphere centered on the cluster center with radius $(r_p)$ that equals the cluster radius (r) times a factor $\alpha$, i.e. $r_p = \alpha r$, but this should not be considered limiting. In our exemplary embodiment we choose $\alpha = 1.5$.

Figure 3:
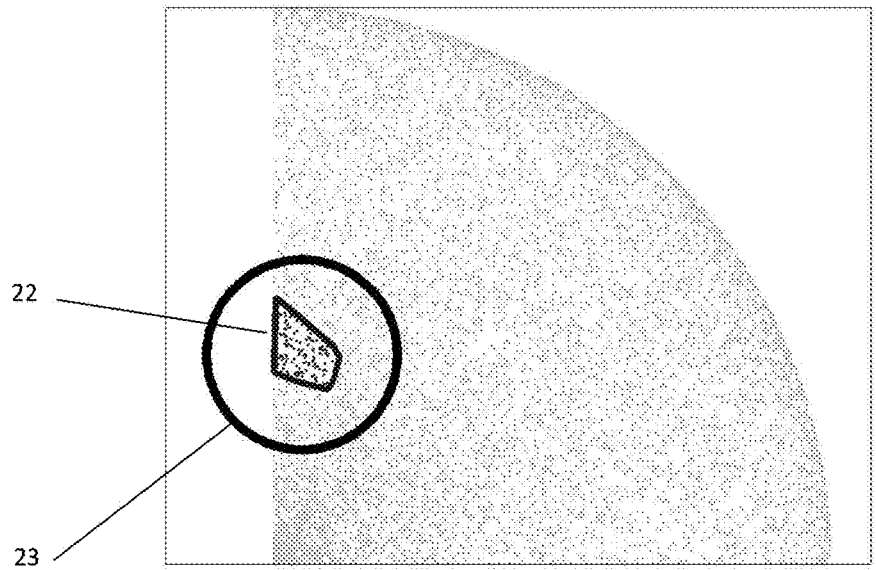
FIG. 3 illustrates the proxy surface for one cluster of the hierarchical clustering skeleton.

FIG. 3 is an illustration of the proxy surface for an exemplary cluster and discretization point distribution. Considering a level 3 cluster 22 (which happens to be one of the children of the level 2 cluster 12 of FIG. 2(c), the interactions between points that are enclosed by the respective surface 23 are explicitly computed. The interactions between points on opposite sides of the surface are approximated.

The near-field point interactions of a cluster under consideration are found in clusters that are at the same level and the vicinity of the cluster under consideration. To facilitate the search for near-field point interactions the embodiment employs a data structure called a near neighbor interaction list data structure. This is arranged hierarchically, with a record for each cluster. The record for each cluster referred to as a near neighbor interaction list of the cluster lists other clusters of the vicinity whose bounding boxes may intercept the proxy surface of the cluster, and therefore may have points enclosed by the proxy surface. Note that the near neighbor interaction list is a structure that is used to facilitate the location of neighboring clusters that possibly have near-field point interactions. Clusters that are included in the near neighbor list do not necessarily have near-field point interactions.

The criterion for including a cluster S in the near neighbors list of a particular cluster T is the proximity of S to T. In the embodiment the proximity is subject to the multipole acceptance criterion (MAC) used in FMM, but this should not be considered limiting or restraining in any sense. According to the MAC, S and T are near neighbors if they are not well-separated. The criterion of well-separateness is based on the distance of the centers of S and T. Considering T centered at $x_T$, with range $r_T$, and S centered at $x_s$ with range $r_s$, S and T are not well separated if $(r_t+r_s) > \theta |x_s - x_T|$, where $\theta$ is a tolerance parameter.

In step 4 of the method of FIG. 1, the near neighbor interaction list is produced.

The first sub-step of step 4 is to search for the near neighbor clusters of every cluster in the skeleton. In the embodiment, the search for the near neighbor clusters is realized by the dual tree traversal technique, but this must not be considered limiting or restraining. The hierarchical clustering skeleton is recursively traversed, and all pairs of clusters are examined. Each pair of clusters examined includes a target cluster T, which is the cluster whose list is being formed, and a source cluster S, which is the cluster that is a candidate for the interaction list of the target. The criterion of well-separateness is applied to the input pair of clusters, and if they are near neighbors, S is added to the near neighbor interaction list of T.

The target and source clusters under examination are subject to one invariant condition: The parent clusters, or some other ancestors, of the source and the target clusters under examination, are near neighbors. The distance between the centers of the target and source clusters is computed, and the MAC is applied. If the distance is found smaller than the sum of the cluster ranges multiplied by the tolerance parameter $\theta$, the source cluster S is added in the near neighbor list of the target cluster T. The near neighbor list formation process by the dual tree traversal technique is described in Algorithm 2 using pseudocode. The Algorithm is formulated recursively, but this must not be considered restrictive, since the algorithm may be realized by ether a recursive or an iterative implementation. The function traverse( ) takes as input the two clusters T and S. The function areNeighbors( ) applies the MAC. If the two clusters are neighbors, S is added in the near neighbor list of T. If T is an intermediate node (not a leaf) of the skeleton, the function traverse( ) is recursively called for all pairs of the children of S and T. The recursion terminates if the target cluster T or the source cluster S is a leaf.

---

Algorithm 2: Dual Tree Traversal - Near Neighbor List Formation

NN: Near-neighbor interaction list
    Function T ← traverse(T,S)
    |    if areNeighbors(T,S)then
    |    |    NN(T) ← NN(T) ∪ S
    |    |    if isnotLeaf(T) and isnotLeaf(S) then
    |    |    |    for all $c_T \in$ children(T)do
    |    |    |    |    for all $c_s \in$ children(S) do
    |    |    |    |    |    $c_T$ ← traverse($c_T, c_S$)

---

Figure 4:
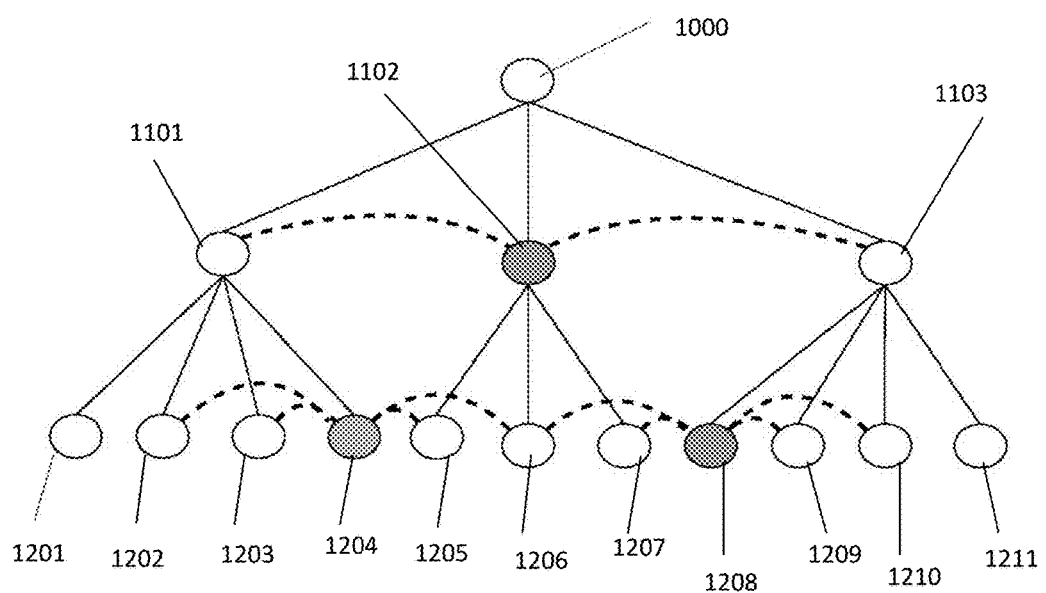
FIG. 4 illustrates schematically the near-neighbor interaction list for two clusters of a three-level hierarchical clustering skeleton.

FIG. 4 illustrates a three level hierarchical skeleton, having a root node 1000, three level one nodes 1101, 1102, 1103, and eleven level two nodes (leaves) 1201, 1202, 1203, 1204, 1205, 1206, 1207, 1208, 1209, 1210 and 1211. The near neighbor list for one level one node 1102, and two leaves 1204, 1208 are illustrated by the dashed lines in the diagram. Specifically, considering the node 1102 at level 1 and nodes 1204 and 1208 at level 2, the node 1102 has the nodes 1101 and 1103 in its near neighbor list. Additionally, the node 1204 has the nodes 1202, 1203, 1205 and 1206 at level 2 in its near neighbor list. The node 1208 has the nodes 1206, 1207, 1209 and 1210 at level 2 in its near neighbor list.

Figure 5:
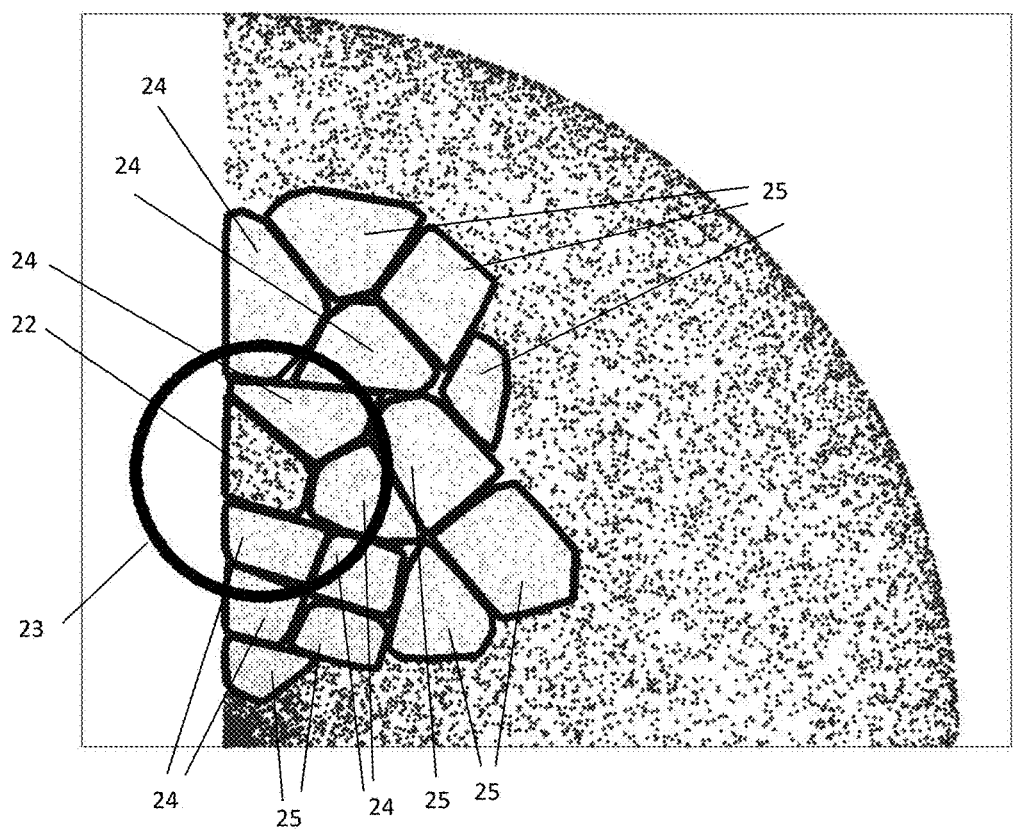
FIG. 5 is a schematic illustration of a cluster, its near neighbor clusters, and the proxy surface.

FIG. 5 illustrates the clusters that form the near neighbor list of the cluster 22 of FIG. 3, having the proxy surface 23. The nearest neighbor list for cluster 22 includes the level 3 clusters 24 and 25. The clusters 24 have points that are enclosed by the proxy surface 23. The clusters 25 have no points enclosed by the proxy surface 23 but are included in the near neighbor list of 22 because they passed the MAC. Only points within the proxy surface 23 take part in the computation of the near-field interactions.

4 Matrix Compression

In step 5 of the method of FIG. 1, the matrix A is compressed by computing a low-rank factorization of its off-diagonal blocks in all levels of the skeleton structure. The blocks of A are defined by the skeleton structure. The partitioning of discretization points to clusters is essentially a grouping of the rows and columns of the matrix A. The mutual interactions of the points of a cluster form a block of the main diagonal of the matrix. The off-diagonal blocks contain interactions of points in different clusters. In every level of the skeleton a compressed representation of A, denoted by $A^l$, is computed, where l denotes the level of the skeleton, $l \in \{0, 1, 2, \ldots, L\}$. Each matrix $A^l$ is obtained by compressing the rows and columns of the matrix $A^{l+1}$, starting from the matrix $A^L = A$, whose blocks are formed by the interactions of the leaves of the skeleton.

The entries of a block $A_{i,j}$ of the matrix $A^L$ contain the interactions between the points of the leaf $J_i$ and the points of the leaf $J_j$. The matrix A is compressible if $A_{i,j}$ is low rank and may be factored as a product of low rank matrices: $A_{i,j} = L_i S_{i,j} R_j$, where $A_{i,j} \in \mathbb{C}^{n_i \times n_j}$ denotes the i-th and j-th off-diagonal block of the matrix, $L_i \in \mathbb{C}^{n_i \times r_i}$, $S_{i,j} \in \mathbb{C}^{r_i \times r_j}$ and $R_j \in \mathbb{C}^{r_j \times n_j}$. The matrices $L_i$ and $R_i$ are obtained by Interpolative Decomposition (ID) of the matrix i-th and j-th block row $A_{(i,:)}$ or block column $A_{(:,j)}$ of A. Where the (:) symbol denote all the rows or columns of the matrix. By the ID the following factorizations are obtained:

$$A_{(i,:)} = A_{(I_r,:)} R_i, \quad A_{(:,j)} = L_j A_{(:,J_C)} \qquad (1)$$

The vectors $I_r$ and $I_c$ contain the indexes of the points that continue to the next level of skeleton compression.

The computational complexity of the ID is reduced by using compressed versions of $A_{(i,:)}$ and $A_{(:,j)}$, where the entries that correspond to the far-field interactions are approximated via the point distribution on the proxy surface. The entries of $A_{(i,:)}$ that belong to the near-field interactions are recovered from the near neighbor list and are computed explicitly. The entries of $A_{(i,:)}$ that belong to the far-field interactions are substituted by the interactions with the point distribution on the proxy surface. A new matrix $\hat{A}_{(i,:)}$ is formed by using the entries of the near-field interactions of $A_{(i,:)}$ and the interactions with the point distribution on the proxy surface. The matrix $\hat{A}_{(i,:)}$ is used to compute the ID. The same applies for matrix $\hat{A}_{(:,j)}$.

At any level of the skeleton structure the matrix $A^l$ is expressed in the block factorization form:

$$A^l = D^l + L^l A^{l-1} R^l \qquad (2)$$

where $A^{l-1}$ is the compressed matrix of level l–1, $D^l$ is a diagonal block matrix that contains the intra-cluster point interactions which are the diagonal blocks of $A^l$. The matrices $L^l$ and $R^l$ are block diagonal and their main diagonals contain the matrices $L_i^l$ and $R_j^l$ $$L^l = \begin{bmatrix} L_1^l & 0 & 0 & 0 \\ 0 & L_2^l & 0 & 0 \\ 0 & 0 & \ddots & 0 \\ 0 & 0 & 0 & L_{ml}^l \end{bmatrix}, R^l = \begin{bmatrix} R_1^l & 0 & 0 & 0 \\ 0 & R_2^l & 0 & 0 \\ 0 & 0 & \ddots & 0 \\ 0 & 0 & 0 & R_{ml}^l \end{bmatrix}$$

Where $m_l$ is the number of clusters in level l. The matrix $A^{l-1}$ is formed by the blocks $S_{i,j}$.

The formula (2) may be expanded to all levels of the skeleton ($l \in \{0, 1, 2, \ldots, L\}$):

$$A^L = D^L + L^L(D^{L-1} + L^{L-1}(D^{L-2} + \ldots (D^1 + L^1 A^0 R^1) \ldots) R^{L-1}) R^L \quad (3)$$

Note that for the root of the tree $A^0 = D^0$.

5 Matrix-Vector Multiplication

Note that the compressed approximation matrix $A^L$ given by equation (3) in the case l=L, makes possible a fast matrix-vector multiplication operation which is used in the following steps. The fast matrix-vector multiplication is done by multiplying the telescoping factorization of equation (3) from the right with the vector which is an estimation of the first physical quantity.

Formula (3) reflects the level-wise dependency of the computations. The process comprises an upward pass which compresses the matrix starting from the leaf clusters and moving towards the root and a downward pass which starts from the root of the skeleton and moves toward the leaves.

Figure 6:
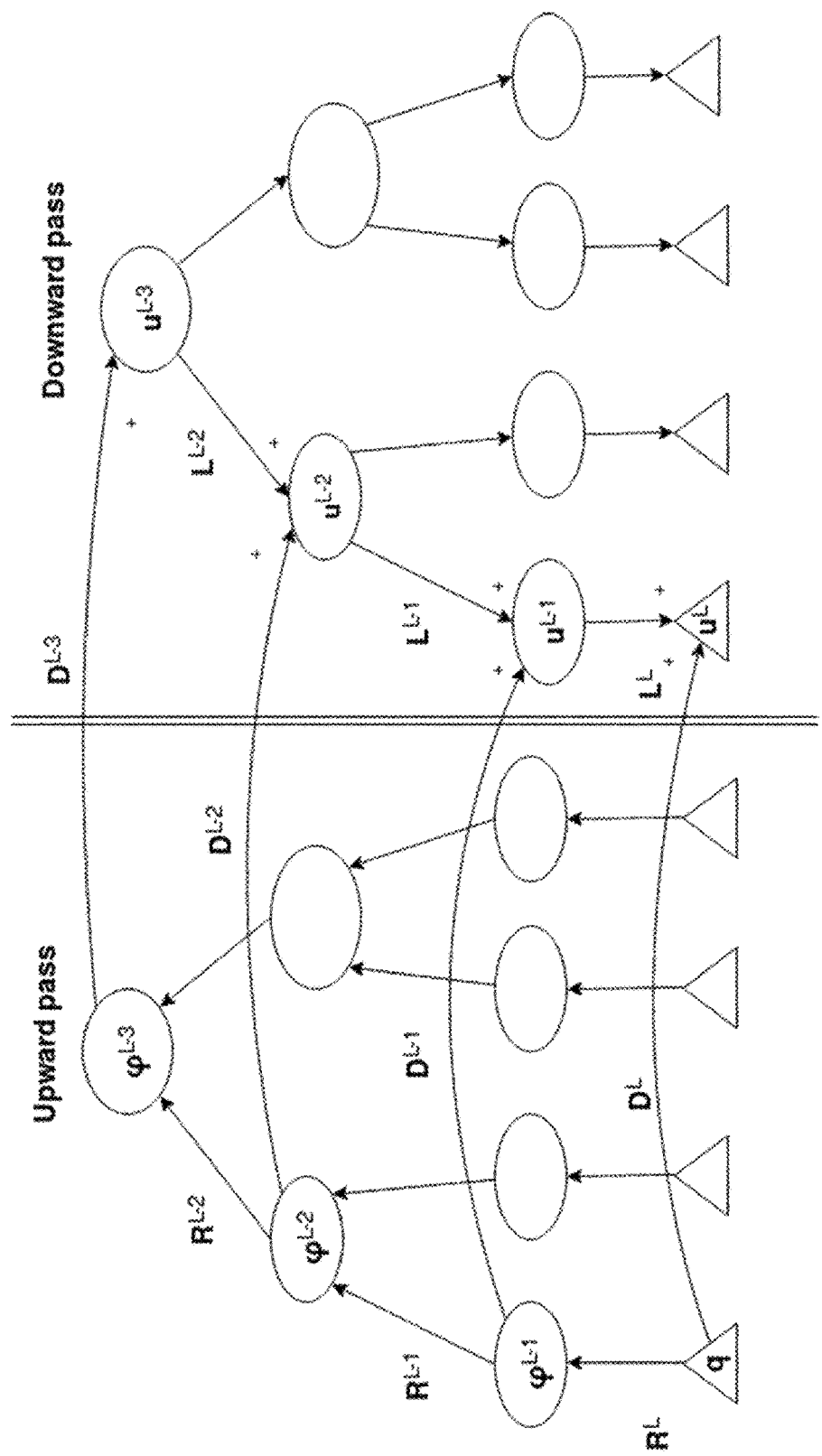
FIG. 6 illustrates the flow of matrix compression, in first upward and then downward passes.

The computational flow of the matrix compression and the matrix-vector multiplication is shown in FIG. 6. The process is composed of the upward pass that traverses the tree from the leaves to the root and the downward pass which traverses the tree from the root to the leaves. The matrix compression computes the matrices $L^l$, $R^l$ and $D^l$, the rows and columns that continue to the next level for all the clusters of the hierarchy. The upward pass computes a compressed vector of first physical quantity estimations in every level $\phi^l = R^{l+1} \phi^{l+1}$, $\phi^L = q$, where q denotes the estimate of the vector x of the first physical quantity assigned to every point, $\phi^l = [\phi_1^l \phi_2^l \ldots \phi_m^l]^T$ is the compressed vector for the first physical quantity at level l and $\phi_i^l$ is the compressed first physical quantity in the i-th cluster of the l-th level. The downward pass aggregates the interactions from the parent box ($u^{l-1}$) and the interactions between the sibling clusters ($D^l$): $u^l = D^l \phi^l + L^l u^{l-1}$. The final results is the vector $u^L$.

6 Determination if the System is Ill-Conditioned

In step 6 of the method of FIG. 1 it is determined whether the system is ill-conditioned or has multiple right-hand sides. The criterion to decide if a system is ill-conditioned may be based on: the system geometry, the method of BEM integration and integral discretization, or a user controlled input.

If it is determined that the system is ill-conditioned or has multiple right-hand sides, a direct system solution is performed in step 7 by matrix inversion. Conversely, if the system is not ill-conditioned and there is only a single right-hand side, an iterative solution is performed in step 8.

7 Matrix Inversion

The operation of fast matrix inversion used in the direct solution of a system of linear equations (step 7) is based on the matrix compression and is derived by a similar factorization:

$$A^{-1} = \tilde{D} + \tilde{L}\tilde{A}^{-1}\tilde{R} \quad (4)$$

where $A^{-1}$ is the inverse of the matrix A and $\tilde{A}^{-1}$ is an inverse operator for the level L−1 of the tree hierarchy. The inverse operator for any level of the tree l is: $\tilde{A}^l = A^l + E^{l+1}$, l<L. The matrix $E^{l+1}$ is block diagonal and represents the contribution of the children of every cluster to the inverse operator. The matrix $(\tilde{A}^l)^{-1}$ may be factored as:

$$(\tilde{A}^l)^{-1} = \tilde{D} + \tilde{L}(\tilde{A}^{l-1})^{-1}\tilde{R} \quad (5)$$

The matrices $\tilde{R}$, $\tilde{L}$, and $\tilde{D}$ are products of the matrices R, L, and D computed in the matrix compression:

$$\tilde{R} = ERF^{-1}, \tilde{D} = F^{-1}(I - L\overline{R}), \text{ and } \tilde{L} = F^{-1}LE \quad (6)$$

Here E is defined by $E = RF^{-1}L$ and $F^l = D^l + E^{l+1}$. Note that for matrices of the same level of the tree hierarchy l is omitted.

The expanded formula that describes the matrix inversion is:

$$A^{-1} = \tilde{D}^L + \tilde{L}^L(\tilde{D}^{L-1} + \tilde{L}^{L-1}(\tilde{D}^{L-2} + \ldots (\tilde{D}^1 + \tilde{L}^1(\tilde{A}^0)^{-1}\tilde{R}^1) \ldots)\tilde{R}^{L-1})\tilde{R}^L \quad (7)$$

Note that for l=L, $\tilde{A}^L = A^L$ and $F^L = D^L$. Let $\tilde{R}_C$, $\tilde{D}_C$, $\tilde{L}_C$, $F_C$, $F^{-1}_C$, $L_C$ and $R_C$ be blocks of the above matrices that are associated with any cluster C of the skeleton.

The matrix inversion comprises of the upward and downward passes over the skeleton structure. The upward pass starts from the leaves and moves towards the root, computing the matrices $\tilde{R}_C$, $\tilde{D}_C$, $\tilde{L}_C$, $F_C$, and $F^{-1}_C$, in all clusters of the skeleton. In every cluster C, the matrix $F_C$ is computed. If the cluster is a leaf, the matrix $F_C$ equals the matrix of point interactions $D_C$. If the cluster is a not a leaf, the matrix $F_C$ is the aggregated point interactions of matrix $D_C$ and the diagonal matrix $E_C$ of child interactions. The matrix $F^{-1}_C$ is computed by inverting the matrix $F_C$. The matrices $\tilde{R}$, $\tilde{L}$, $\tilde{D}$ are computed as described by equation (5). After the computation of all matrix operators, the vectors given by $\tilde{\phi}^{l-1} = \tilde{R}^l \tilde{\phi}^l$, $\tilde{\phi}^L = b$ and $\tilde{\psi}^l = \tilde{D}^l \tilde{\phi}^l$ are computed. We denote by $\tilde{\phi}^l$ a compressed vector of second physical quantities and by $\tilde{\psi}^l$ the contribution of the compressed second physical quantities to the computation of the compressed first physical quantities $\tilde{u}^l$ at level l. The operators that are stored in memory for every cluster, to be used in the downward pass, are the matrix $\tilde{L}$, and the vector $\tilde{\psi}$.

The computations of the upward pass are described in pseudocode in Algorithm 3. The recursion is post-order to denote that the process moves from the leaves to the root of the skeleton. The function upward( ) executes the upward pass. The input is a cluster C which implies that all attributes related to the input cluster are available to the function upward( ). The function isLeaf( ) returns true if the cluster C is a leaf. If C is a leaf, the recursion stops and returns. If C is not a leaf upward( ), is recursively called for the children of C. Upon returning from the recursion, the function computes all matrices related to C. The function inv( ) computes the inverse of the input matrix. The function isRoot( ) returns true if the input cluster is the root of the skeleton.

The downward pass starts from the root and moves towards the leaves, and every cluster aggregates its parent interactions. The product $\tilde{L}^l \tilde{u}^{l+1}$ is added to the vector $\tilde{\psi}^l$ which was computed at the upward pass. When the process reaches the leaves, the vector $x = \tilde{u}^L$ provides the solution of the linear system. The downward pass is described in pseudocode by Algorithm 4. The recursion is pre-order to denote the processing of the clusters from the root to the leaves. The function downward( ) executes the downward pass. The input is a cluster C which implies that all attributes related to the input cluster are available to the function. When a cluster is visited the product $\tilde{L}^l \tilde{u}^{l+1}$ is added to the vector $\tilde{\psi}^l$. The function isLeaf( ) returns true if the cluster C is a leaf. The function not( ) inverts the logical output of the function isLeaf( ). If C is not a leaf, the function downward ( ) is called to process the children of C.

Algorithm 3: Upward pass

Function $C \leftarrow$ upward $(C)$ if $isleaf(C)$ then
$\quad F_C = D_C$
$\quad \varphi_C^l = b$
else
for all $c_i \in$ children $(C)$ do
$\quad \lfloor c_i \leftarrow$ upward$(c_i)$ $$F_C = D_C + \begin{bmatrix} E_{c_1} & 0 & 0 \\ 0 & E_{c_i} & 0 \\ 0 & 0 & E_{c_k} \end{bmatrix}, \quad \begin{array}{l} c_i \in \text{children } (C) \\ k = numOfChildren(C) \end{array}$$

$F_C^{-1} = inv(F_C)$
if $isRoot(C)$ then
$\quad | \tilde{A}_C^{-1} = F_C^{-1}$
else
$R_C, L_C \leftarrow loadCompressionOperators(C)$
$E_C = R_C F_C^{-1} L_C$
$\tilde{R}_C = E_C R_C F_C^{-1}$
$\tilde{D}_C = F_C^{-1}(I - L_C \tilde{R}_C)$
$\tilde{L}_C = F_C^{-1} L_C E_C$ $$\tilde{\varphi}_c^l = \begin{bmatrix} \tilde{\varphi}_{c_1}^l \\ \tilde{\varphi}_{c_i}^l \\ \tilde{\varphi}_{c_k}^l \end{bmatrix}$$

$\tilde{\varphi}_C^{l-1} = \tilde{R}_C \tilde{\varphi}_C^l$
$\tilde{\varphi}_C^{l-1} = \tilde{D}_C \tilde{\varphi}_C^l$ Algorithm 4: Downward pass Function $C \leftarrow$ downward $(C)$
$\quad \tilde{L}_C, \tilde{\Psi}_C^l \leftarrow loadLocalOperators(C)$
$\quad p \leftarrow parentOf(C)$
$\quad \tilde{u}_C^l = \tilde{\Psi}_C^l + \tilde{L}_C \tilde{u}_p^{l-1}$
$\quad$ if not$(isLeaf(C))$ then
$\quad |$ for all $c_i \in$ children $(C)$ do
$\quad \quad \lfloor c_i \leftarrow$ downward$(c_i)$ In step 8, an iterative solution is performed. Firstly a first preliminary estimate of the first physical quantity is set in any way (e.g. generated randomly, or set to the same value (e.g. zero at each discretization point). Then, using an integer index k which is initially equal to 1, the embodiment performs the following steps:

- a matrix-vector multiplication step of multiplying the approximated interaction matrix by a vector formed of the k-th preliminary estimate of the first physical quantity at each of the degrees of freedom, in the manner described in section 5 above;
- for each degree of freedom forming a respective residual value by subtracting the respective result of matrix multiplication from the value of the second physical quantity at the degree of freedom;
- using the residual values to improve the preliminary estimates of the first physical quantity according to an updating rule; and
- and setting k to k+1.

The updating rule may vary according to the variant of the algorithm that is used (for example conjugate gradient method, etc.). This process continues until a termination criterion is met. For example, when the norm of the residual vector is found smaller than a predefined threshold.

In step 9 of the method of FIG. 1, the solution is made available to the user by displacing, printing, storing, or by using any other means.

Advantages of the Embodiment

The embodiment is capable of solving ill-conditioned systems of equations with highly irregular point distributions and systems with multiple right-hand sides.

The solution time of the direct solver does not depend on the condition number of the system, in contrast to a conjugate gradient-based iterative solver where the solution time degrades with the condition number. The time efficiency of a direct solver is affected only by the arithmetic complexity of the system matrix inversion operation, which depends on the ability of the algorithm to compress the system matrix.

The system matrix inversion and matrix-vector multiplication using recursive skeletonization with a hierarchical clustering data structure is advantageous compared to the use of recursive skeletonization with an octree data structure. The reason is that the hierarchical clustering is adaptive to the discretization point distribution and can more efficiently compress the system matrices.

9 Structure of the Computer Apparatus

Figure 7:
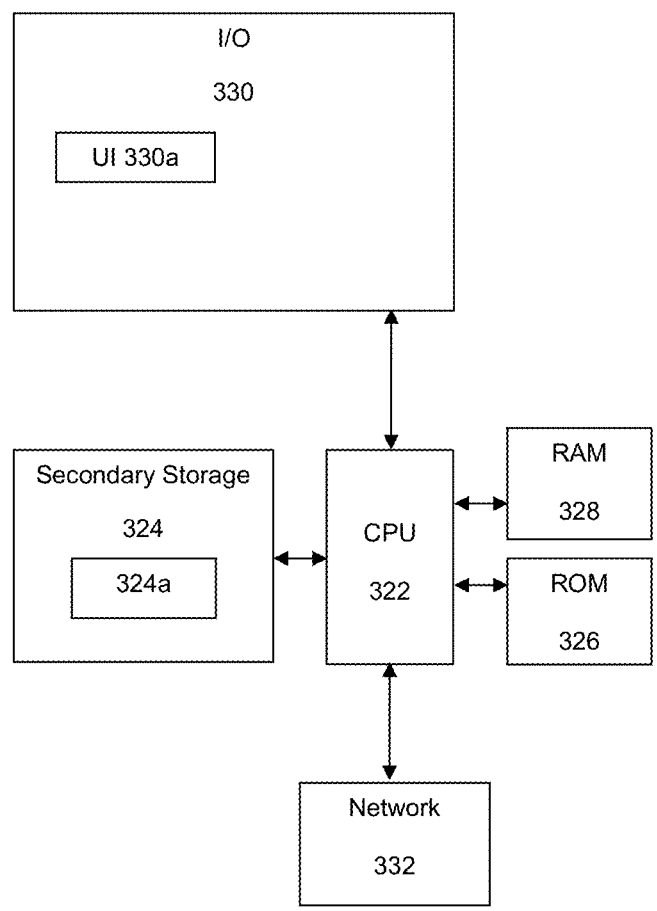
FIG. 7 is a functional block diagram of an exemplary computing apparatus suitable to carry out the functional steps of the method of FIG. 1.

FIG. 7 is a block diagram of a computer apparatus for performing the method of FIG. 1.

The technical architecture includes a processor 322 (which may be referred to as a central processor unit or CPU) that is in communication with memory devices including secondary storage 324 (such as disk drives or memory cards), read only memory (ROM) 326, random access memory (RAM) 328. The processor 322 may be implemented as one or more CPU chips. The technical architecture further comprises input/output (I/O) devices 330, and network connectivity devices 332.

The I/O devices comprise a user interface (UI) 330*a*. The UI 330*a* may comprise a touch screen, keyboard, keypad or other known input device.

The secondary storage 324 is typically comprised of a memory card or other storage device and is used for non-volatile storage of data and as an over-flow data storage device if RAM 328 is not large enough to hold all working data. Secondary storage 324 may be used to store programs which are loaded into RAM 328 when such programs are selected for execution.

In this embodiment, the secondary storage 324 has an order generation component 324*a*, comprising non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

While the foregoing description has described exemplary embodiments; it will be understood by those skilled in the art that many variations of the embodiment can be made within the scope of present invention as defined by the appended claims.

For example, as explained above, the matrix compression step 5 is the setting up of the operators R, L, D, etc. for every cluster of the skeleton. The matrix inversion is the computation of the $\tilde{R}$, $\tilde{D}$, $\tilde{L}$ etc. for every cluster of the skeleton. The matrix-vector multiplication is the multiplication of the vector of first physical quantity estimates with the compressed matrix using the operators computed for every cluster. If the matrix inversion is used, the vector multiplied is the vector of second physical quantities, instead of the first physical quantities estimates. In the embodiment of FIG. 1, all operators are computed for every cluster and stored in memory, so that the matrix-vector multiplication can take place, but this approach may not be maximally efficient in time or memory requirements.

In another embodiment, the matrix compression, inversion, and multiplication are overlapping, not distinct parts. This embodiment may compute the necessary compression operators in one level of the tree, and compute the inversion operators. If the system can be solved by matrix inversion, the embodiment stores only the necessary operators in memory, and performs the vector multiplication for that level. After concluding the above steps, the embodiment moves one level up in the cluster hierarchy. Thus, in this variant, step 5 of FIG. 1 overlaps with steps 7 or 8. In other words, steps 5 to 8 are replaced by an equivalent set of steps which are performed for each level of the cluster hierarchy. Furthermore, the decision in step 6 can be made earlier, since the required information is available following step 1.

In a further variation of the embodiment, the values of more than one unknown first physical quantity can be estimated, given the values of the same number of known second physical quantities. That is, a matrix X as given by Eqn. (2) is estimated, rather than a single vector x.

Fabrication of an Electronic Component

Figure 8:
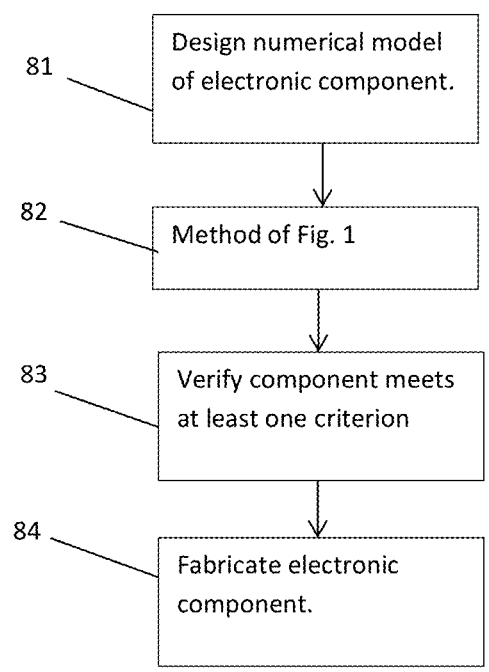
FIG. 8 shows a process for fabricating an electronic component.

FIG. 8 shows a process for fabricating an electronic component which is an embodiment of the invention. The component may be a capacitive touch sensor. A three-dimensional numerical model (design model) is formed of the electronic component, which comprises one or more geometric objects (i.e. elements having a specified geometry). The geometric objects may respectively be one or more conductor elements and one or more dielectric elements. The electronic component is designed in a computer-aided design (CAD) environment in step 81. The numerical model includes the potential at surface points of the electronic component. Then, in step 82, the numerical model is used as the starting point to perform the method of FIG. 1. In step 2 of the method of FIG. 1, the numerical model is discretized into degrees of freedom in a BEM manner.

The result of performing step 82 is to calculate the charges on the surfaces of every conductor element of the electronic component. From the result, it is possible to derive capacitance, measured in nano-farad (nF), between a given conductor element and itself (self-capacitance), and/or between any given conductor element and other specified conductor elements.

The following paragraphs place the notation and terminology that is used in the earlier parts of the present text into the particular context of capacitance analysis for capacitive touch sensors.

The capacitance is computed using the values of the vector of the first physical quantities (x) which are the charges on the surface of every geometric object of the touch sensor. The vector of second physical quantities (b) encodes the potential on the surfaces of the geometric objects. The surface charge is measured in Coulomb per square meter ($C/m^2$) and the potential is measured in Volts (V). Every entry of x and b corresponds to a degree of freedom in the discretized geometry. The capacitance between m conductors requires m solutions of the system of linear equations A x=b, where A is the BEM stiffness or interaction matrix, according to a Poisson equation.

The method of FIG. 1 is used in step 82 to obtain the solutions of the system of equations. Each solution $x_i$ is obtained with a different configuration of the vector potentials $b_i$. For the $i^{th}$ conductor, where i=[1, . . . , m], the surface of the corresponding object is raised to unit potential, and the rest of the surfaces are set to zero potential. The self-capacitance is numerically equal to the sum of the surface charges on the $i^{th}$ conductor. Hence the self-capacitance is the sum of the entries of $x_i$, which correspond to degrees of freedom on the $i^{th}$ conductor. The mutual capacitance between conductors i and j is numerically equal to the negative value of the sum of the entries of $x_i$, which correspond to degrees of freedom of the $j^{th}$ conductor.

In step 83, the calculated values of the capacitance are used to verify that the electronic component complies with one or more criteria, e.g. industry standards.

If this criterion is met then in step 84 an electronic component (e.g. touch sensor) according to the numerical model is fabricated.

Optionally, the fabricated electronic component may be a prototype. Electric measurements may be made of the prototype using electronic sensor(s) to verify the numerical values that were obtained in step 82. If the verification is successful, the electronic component according to the numerical model may be fabricated in great numbers.

The invention claimed is:

1. A method of fabricating an electronic component, the method comprising:
    (a) forming a numerical model of physical structure of the electronic component in a three-dimensional space, the numerical model comprising, for each of a plurality of discretization points in the three-dimensional space, a known value of an electrical potential of the electronic component at the discretization point, an unknown electrical charge distribution at the discretization points being related to the electrical potential of the discretization points, by a Poisson equation expressed via an interaction matrix A having elements which correspond to respective pairs of the discretization points, (b) repeatedly applying a clustering algorithm, to classify the discretization points into a hierarchical tree structure having a plurality L+1 of levels, labelled by an integer index l=0, . . . ,L, where level l=0 of the tree structure is all the discretization points, level l=1 of the tree structure is composed of non-overlapping clusters of the discretization points, and for l=2, . . . ,L, level l of the tree structure is composed of, for each cluster of the (l−1)-th level, a respective plurality of non-overlapping clusters of the discretization points of that cluster of the (l−1)-th level, the clustering algorithm defining the clusters by minimizing distances between discretization points of each cluster to a respective center of that cluster, and maximizing distances between points of each cluster to the centers of other clusters;

(c) using the hierarchical tree structure to form a compressed interaction matrix which is expressed recursively according to the levels;

(d) determining the electrical charge distribution of the discretization points from the values of the electrical potential at the discretization points and the compressed interaction matrix;

(e) determining whether the determined electrical charge distribution meets a criterion; and (f) determining that the electronic component is to be fabricated according to the numerical model when the electrical charge distribution meets the criterion, or that the electronic component is not to be fabricated according to the numerical model when the electrical charge distribution does not meet the criterion.

2. The method of claim 1 in which the electronic component is a capacitive touch sensor.

3. The method of claim 1 in which the step (d) of determining the electrical charge distribution is performed by:
forming an inverted matrix from the compressed interaction matrix; and
multiplying the inverted matrix by a vector of values of the electrical potential at the discretization points.

4. The method of claim 1 in which the step (d) of determining the electrical charge distribution is performed iteratively by repeatedly:
multiplying the compressed interaction matrix by a vector formed of preliminary estimates of the electrical charge distribution at each of the discretization points,
forming residual values from the result of matrix multiplication and the values of the electrical potential at the discretization points; and
improving the preliminary estimates of the first physical quantity using the residual values.

5. The method of claim 1 comprising a step, after step (c) and prior to step (d), of determining whether the compressed interaction matrix meets a criterion, and according to whether the determination is positive, performing said step (d) by a process comprising inverting the compressed interaction matrix, or determining the electrical charge distribution iteratively by repeatedly improving successive preliminary estimates of the electrical charge distribution at the discretization points using the result of a matrix multiplication of the compressed interaction matrix and the preliminary estimate of the electrical charge distribution at the discretization points.

6. The method of claim 1 in which the clustering is the algorithm of k-means.

7. The method of claim 1 in which, at each level, the compressed interaction matrix approximates the physical interaction between pairs of discretization points which do not meet a first proximity criterion, the first proximity criterion being based on the cluster in which a first discretization point of the pair of discretization points lies.

8. The method of claim 7 in which the first proximity criterion is that the second point of the pair of discretization points is within a proxy surface of the cluster in which the first of the discretization points lies.

9. The method of claim 7 including:
for each cluster defining a respective list of neighboring clusters of the same level which meet a second proximity criterion;
for each cluster, using the respective list of neighboring clusters to identify discretization points of the neighboring clusters meeting the first proximity criterion.

* * * * *